United States Patent
Zanella et al.

(10) Patent No.: US 7,678,356 B2
(45) Date of Patent: Mar. 16, 2010

(54) PROCESS FOR THE PREPARATION OF CRYSTALLINE MAGNESIUM BOROHYDRIDE

(75) Inventors: Pierino Zanella, Padua (IT); Laura Crociani, Padua (IT); Giovanni Giunchi, Milan (IT)

(73) Assignee: Edison S.p.A., Milan (IT)

( * ) Notice: Subject to any disclaimer, the term of this patent is extended or adjusted under 35 U.S.C. 154(b) by 182 days.

(21) Appl. No.: 11/807,524

(22) Filed: May 29, 2007

(65) Prior Publication Data

US 2007/0286787 A1    Dec. 13, 2007

(30) Foreign Application Priority Data

May 30, 2006    (IT)    ................. MI2006A1048

(51) Int. Cl.
*C01B 6/13*    (2006.01)
*C01B 6/10*    (2006.01)
*C01B 3/00*    (2006.01)

(52) U.S. Cl. ................. 423/286; 423/287; 423/295; 423/658.2

(58) Field of Classification Search ................. None
See application file for complete search history.

(56) References Cited

U.S. PATENT DOCUMENTS

| 2,930,674 A | 3/1960 | Heying |
| 2003/0092877 A1* | 5/2003 | Amendola et al. .......... 528/394 |
| 2005/0069488 A1 | 3/2005 | Zhao et al. |
| 2005/0191236 A1 | 9/2005 | Pinkerton |

FOREIGN PATENT DOCUMENTS

| BE | 559053 | * | 1/1958 |
| EP | 1 496 035 A | | 3/1960 |
| EP | 1 413 546 A | | 4/2004 |

OTHER PUBLICATIONS

Translation of Belgium Pat. 559053.*
Liu et al.; Thermodynamic Reactivity of the Magnesium Vapor with Substrate materials during MgB2 deposition; Physica C; 397, pp. 87-94; 2003).*
European Search Report Dated Mar. 11, 2008.
Wang, S.F. et al.,Properties of Chemical Vapor Deposition Prepared MgB2 Thin Films, Preparation and Characterization, Elsevier, Sequoia IL vol. 443,No. 1, Oct. 11, 2003, pp. 120-123.
Shu-Fang Wang et al., Preparation and Properties of MgB2 Thin Films on LaAlO3 Substrates by Chemical Vapor Deposition, Supercond. Sci. Technol., vol. 16, 2003 pp. 748-751.
Batha H D et al., Magnesium Borohydride and Diborane, J. Applied Chem.Soc. of Chem.Ind., vol. 12, Apr. 1962, pp. 478-481.
R. Koster, Neue Herstellungsmethoden Fur Metallborohydride, Agnew. Chem., (1957), p. 94.
Synthesis of Magnesium Tetrahydroborate, Chemical Abstract 93:87488, May 12, 1984.

* cited by examiner

*Primary Examiner*—Melvin C Mayes
*Assistant Examiner*—Guinever S Gregorio
(74) *Attorney, Agent, or Firm*—Hedman & Costigan, P.C.; James V. Costigan

(57) ABSTRACT

A process is described for the preparation of magnesium borohydride having a high purity and crystallinity, which comprises the reaction of an orgenometallic compound of magnesium of the type $MgX_2$, wherein X is an organic binder selected from alkyl, amide, alkoxide, cyclopentadienyl, aryl, with a derivative of a boron hydride, in a hydrocarbon solvent.

14 Claims, 3 Drawing Sheets

PROCESS FOR THE PREPARATION OF CRYSTALLINE MAGNESIUM BOROHYDRIDE

The present invention relates to a process for the preparation of non-solvated magnesium borohydride, having a high purity and highly crystalline.

It is known that magnesium borohydride is a product which has a potential use as a material for the storage of hydrogen, thanks to its favourable H content (14.8% by weight). It is also described as a reducing chemical agent (see B. D. James and M. G. H. Wallbridge in Prog. Inorg. Chem., vol. 11, (1970), page 99 and references contained therein). This product however has never been described in its crystalline form.

The known preparation methods are based on a dissociation process of the product coordinated with ethyl ether which allows the preparation of products having a purity not higher than 98%, with relatively long preparation times, over a week.

The conventional dissociation methods, moreover, envisage heating to temperatures of up to 230° C., for many hours (see J. Plesek and S. Hermanek, *Collection Czechoslov. Chem. Commun.*, 31, 3845-3858 (1966)). A more recent work describes the possibility of effecting the dissociation at $10^{-3}$ torr in 12 hours (see M. Brenner, H. Noth, M. Warhold, *Eur. J. Inor. Chem.* (2003) Pages 111-119).

In all the methods based on dissociation, however, definite proof of a crystallographic nature has never been given of the crystalline identity of the product, consequently there is no certainty that the products described correspond to the pure magnesium borohydride compound. Another preparation method (described in Konoplev V. N., Bakulina V. M, *Izvetia Akademii NauK SSSR, Seriya Khimicheskaya* (1971), pages 159-161) uses magnesium chloride and sodium borohydride in diethyl ether, but leads to unidentified compounds from a chemical point of view and with a powder X-ray diffraction spectrum different from that of the product obtained with the process, object of the present invention.

The necessity of finding new processes for the preparation of magnesium borohydride which overcome the drawbacks of the processes according to the known art, is therefore particularly felt, allowing a product with a high purity and crystallinity to be prepared, with reduced preparation times; it is also necessary to find processes characterized by a high industrial practicality, in consideration of the possible applications of magnesium borohydride.

An object of the present invention therefore relates to a process for the production of magnesium borohydride having a high purity and crystallinity, characterized in that it envisages a reaction of an organometallic compound of magnesium of the type $MgX_2$, wherein X is an organic binder selected from alkyl, amide, alkoxide, cyclopentadienyl, aryl, with a derivative of a boron hydride, in a hydrocarbon solvent.

The derivative of a boron hydride is preferably selected from metallic borohydrides soluble in hydrocarbons and, in particular, from $Al(BH_4)_3$ or from adducts of the type $H_3B.Y$ wherein Y is a soft base.

The hydrocarbon solvent is selected from an aliphatic or aromatic hydrocarbon solvent and mixtures thereof, preferably heptane, toluene and mixtures thereof.

The organometallic compound of magnesium $MgX_2$ is preferably selected from the series of compounds in which X=alkyl, cyclopentadienyl, alkoxide.

The alkyl is preferably selected from n-But, t-But, $CH_2$(t-But), whereas the preferred alkoxide OR is selected with R=n-propyl.

The adduct $H_3B$—Y is preferably selected from Y=S$(CH_3)_2$.

The process according to the present invention is carried out at atmospheric pressure and at a temperature which varies from −100° C. to 100° C., preferably from −78° C. to 75° C.

The process according to the present invention is effected for an overall time varying from 10 to 48 hours, preferably from 20 to 36 hours.

The main advantage of the process according to the present invention consists in obtaining, when $Al(BH_4)_3$ is used as metallic borohydride, the selective precipitation of magnesium borohydride with respect to the aluminum alkyl, a very reactive secondary product which remains in solution.

A further advantage is represented by the tact that the process according to the present invention is carried out at atmospheric pressure and relatively low temperatures, with respect to those of the processes according to the state of the art, to allow a high-purity product to be obtained with high yields.

Furthermore, the reagents used are already commercial products or can be easily obtained from commercial products and are therefore widely available.

The direct use of diborane gas is therefore avoided at high pressures, this gas being highly toxic and subject to great restrictions for purposes of environmental safety.

Furthermore, the crystalline magnesium borohydride obtained with the process according to the present invention, due to its extremely high purity, is highly reactive, producing heat and violent effervescence if put in contact with water.

The magnesium borohydride obtained with the process according to the present invention also has a high crystallinity which can be verified by X-ray diffraction, with reproducible characteristics in the various preparations.

The angular positions of the maximum X-ray diffraction peaks having the greatest intensity, for the products obtained in various preparations according to the present method, are the following:

2θ (Cu, Kα)=15.24°, 17.06°, 18.30°, 19.46°, 21.34°, 22.98°, 31.16°, 35.08°, 37.40°, evaluated with an error of 0.15°.

In particular, both the product obtained starting from $Al(BH_4)_3$, and the product obtained starting from an adduct of $BH_3$, have the same diffraction diagram, with reference to the main X-ray diffraction peaks, with reference to the most intense diffraction peaks, as is evident form a comparison of the X-ray diffraction diagrams of FIG. 3 and FIG. 5.

In particular, the crystalline magnesium borohydride obtained according to the present invention is a non-coordinated magnesium borohydride which, once dissolved in ethyl ether, is characterized by the $^{11}$B-NMR spectra of FIG. 2 and FIG. 4.

A further object of the present invention therefore relates to a crystalline magnesium borohydride, having a purity which is at least equal to 98. % upon elemental analysis.

The magnesium borohydride obtained with the process according to the present invention can therefore be used, for example, in vapour deposition processes for producing thin films of its dehydrogenated derivatives. Thin films of $MgB_2$, for example, are of particular value and interest as this is a superconductive material of great applicative interest (see J. Nagamatsu, N. Nakagawa, T. Muranaka, Y. Zenitani, J. Akimitsu, Nature 410 (2001) page 63).

A further object of the present invention therefore relates to the use of dehydrogenated derivatives of magnesium borohydride according to the present invention, in vapour deposition processes for producing thin films.

An object of the present invention therefore also relates to a thin film obtained by vapour deposition of dehydrogenated derivatives of crystalline magnesium borohydride according to the present invention.

A further object of the present invention also relates to the use of dehydrogenated derivatives of magnesium borohydride according to the present invention, in dehydrogenation processes for the production of pure hydrogen.

An object of the present invention therefore also relates to the pure hydrogen obtained by the dehydrogenation process of crystalline magnesium borohydride according to the present invention.

Figure 1:
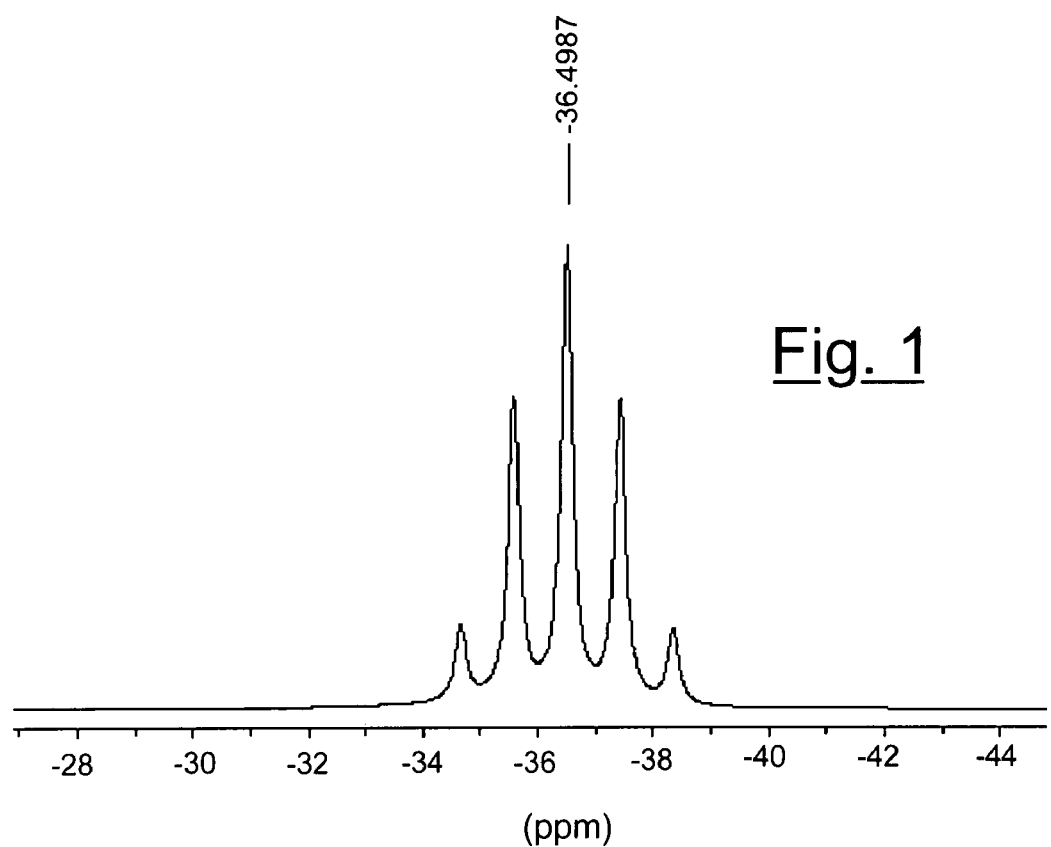
FIG. 1 is an $^{11}$B-NMR spectrum of the precursor of the product of Example 1.

The process for the preparation of crystalline magnesium borohydride according to the present invention can be represented in particular by the following reaction (i):

3Mg(n-But)$_2$+2Al(BH$_4$)$_3$→3Mg(BH$_4$)$_2$+2Al(n-But)$_3$     (i)

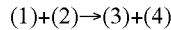
(1)+(2)→(3)+(4)

The reagents are mixed starting from their solutions, in an inert environment: typically (1) is in a solution of heptane 1M (commercial product) and (2) is in a solution of toluene about 10$^{-1}$M.

(2) is obtained by means of the following reaction:

AlCl$_3$+3LiBH$_4$→Al(BH$_4$)$_3$+3LiCl     (ia)

said reaction being carried out under stirring for 60 hours; the solution of (2) is obtained after removal of the precipitate by filtration and subsequent distillation under vacuum.

The resulting toluene solution of (2) is titrated and used directly in the reaction (i), thus avoiding problems associated with the strong reactivity of the pure product (2). It has been verified by means of NMR spectroscopy that the solution of (2) is practically free of Li.

The product (3) precipitates almost instantaneously and after of night of stirring in the reagent mixture is easily separated from the same mixture, by filtration. The crystalline magnesium borohydride produced, care being taken to prevent its contact with air or humidity, is characterized by means of elemental analysis and powder X-ray diffraction. The solution in ethyl ether of the magnesium borohydride produced is also analyzed by means of NMR spectroscopy of the isotope $^{11}$B.

The process for the preparation of crystalline magnesium borohydride according to the present invention can alternatively be represented by the reaction (ii):

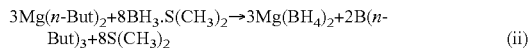
3Mg(n-But)$_2$+8BH$_3$.S(CH$_3$)$_2$→3Mg(BH$_4$)$_2$+2B(n-But)$_3$+8S(CH$_3$)$_2$     (ii)

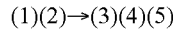
(1)(2)→(3)(4)(5)

The reagents (1) and (2), both commercial products, are respectively used in a solution 1M in heptane and 2M in toluene.

The reaction (ii) is effected in a wide excess of the reagent (2) and there is the almost immediate precipitation of a white powder, consisting of the complex Mg(BH$_4$)$_2$.[S(CH$_3$)$_2$]$_n$, n being non-defined.

When the resulting powder has been filtered, washed and dried, it is dried first with a rotational pump and subsequently with a diffusive pump (10$_{-5}$ mbar) under heat (temperature of about 75° C.), in this way losing the S(CH$_3$)$_2$ groups, and producing pure Mg(BH$_4$)$_2$.

This product is subjected to elemental analysis, by means of NMR spectroscopy of the isotope $^{11}$B and powder X-ray diffraction and, in a solution of ethyl ether, NMR spectroscopy of the isotope $^{11}$B.

Some examples are now provided for illustrative and non-limiting purposes of the present invention.

Figure 2:
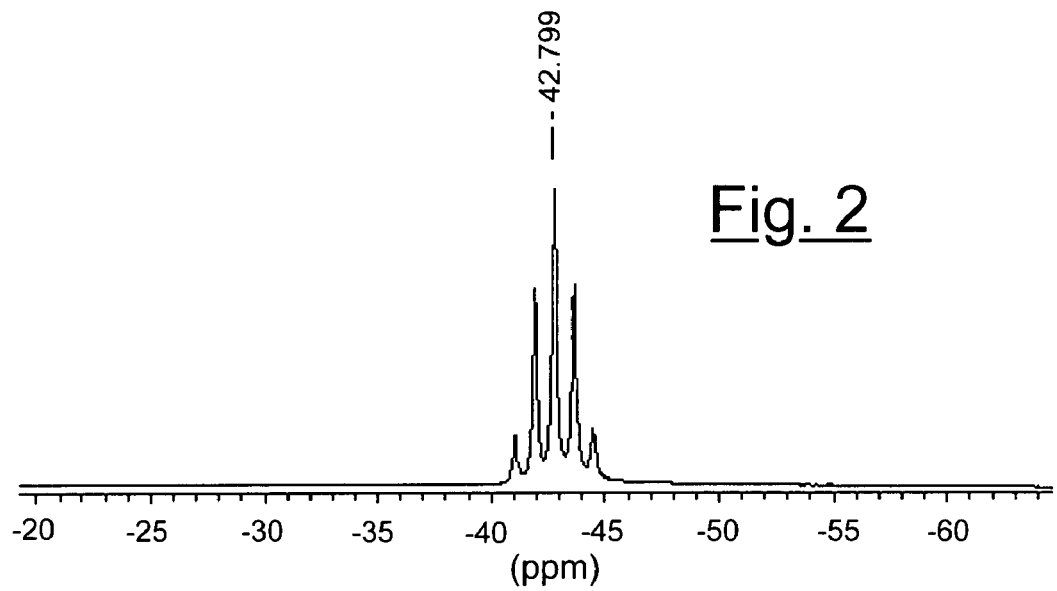
FIG. 2 is an $^{11}$B-NMR spectrum of the precursor of the product of Example 1.
Figure 3:
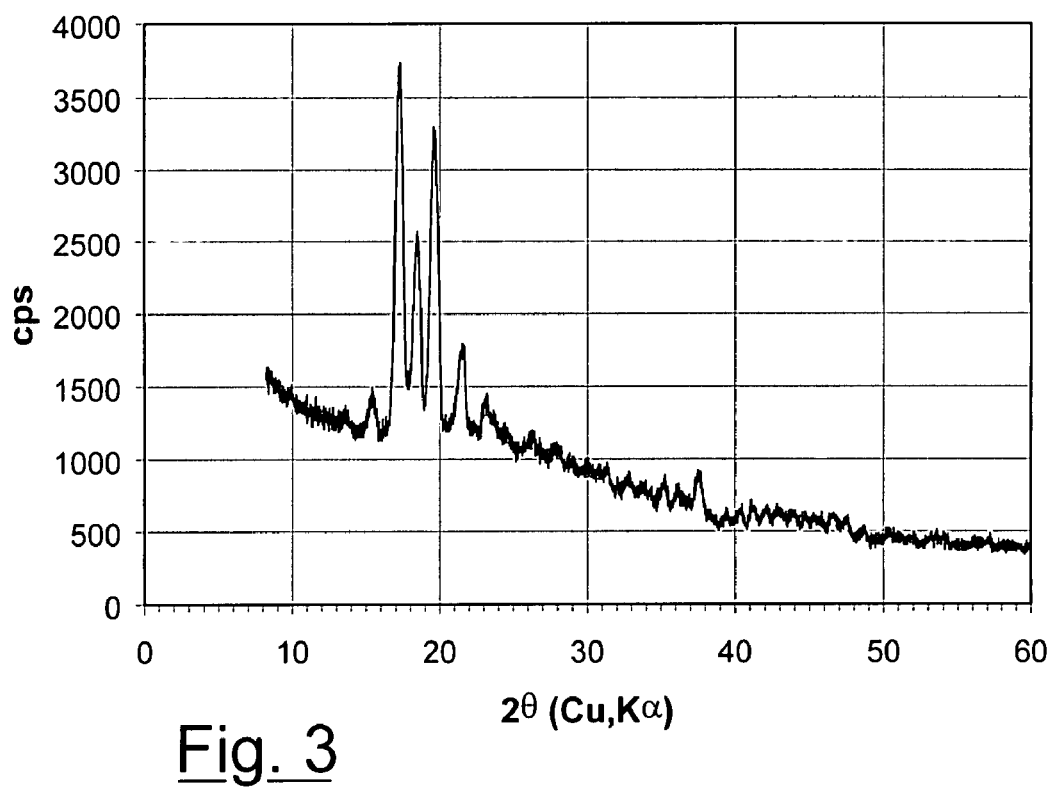
FIG. 3 is an powder X-ray diffraction pattern of the product of Example 1.
Figure 4:
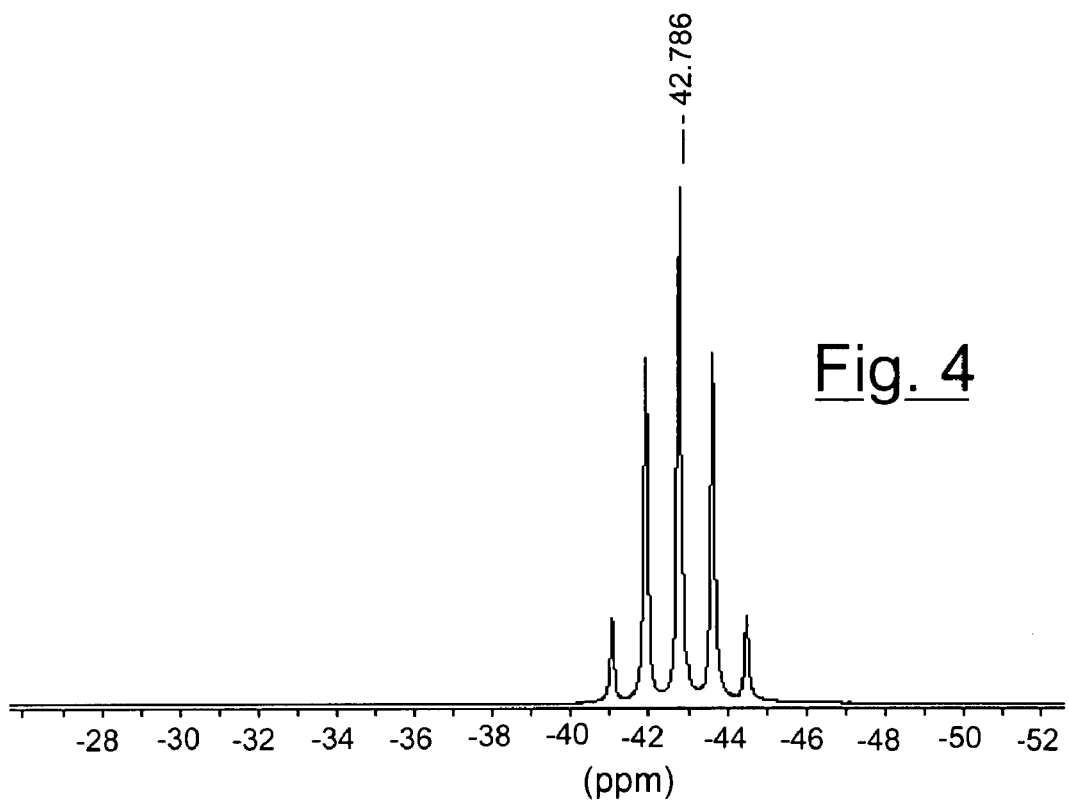
FIG. 4 is an $^{11}$B-NMR spectrum of the product of Example 2.
Figure 5:
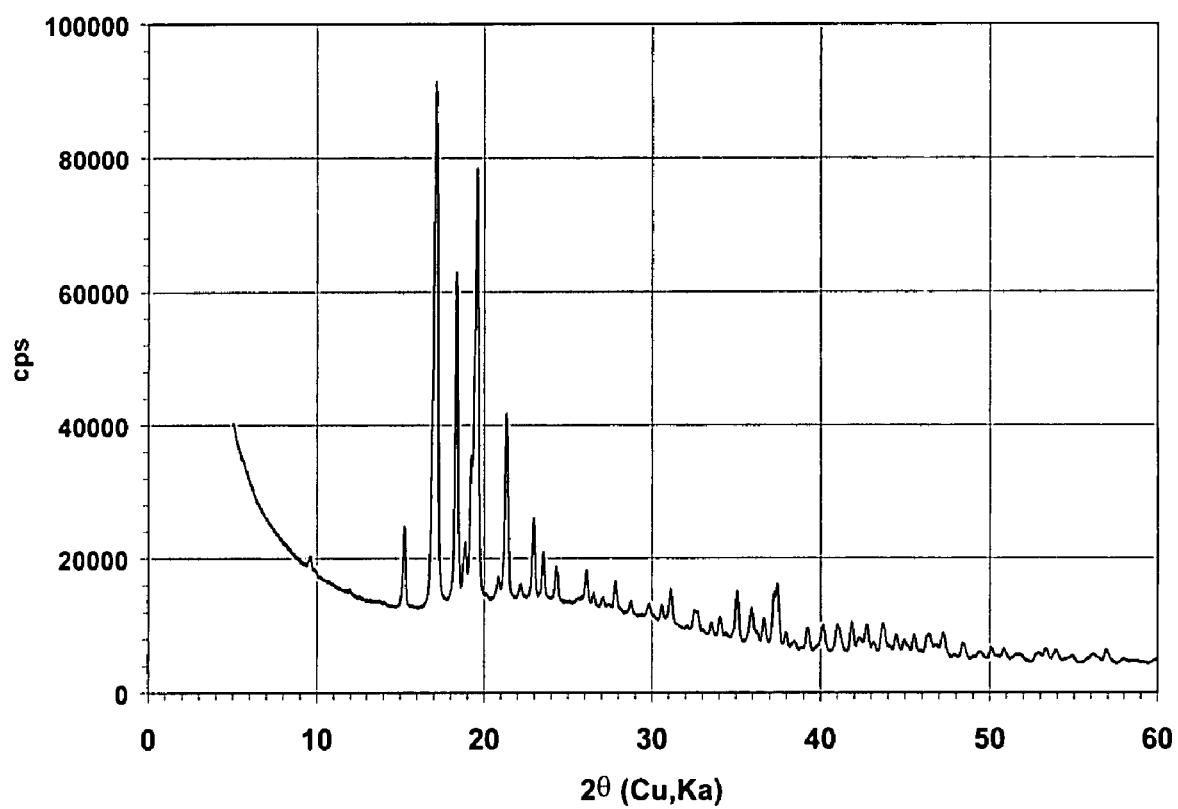
FIG. 5 is a powder X-ray diffraction pattern of the product of Example 2.

FIG. 1 shows the $^{11}$B-NMR spectrum of the precursor Al(BH$_4$)$_3$ in toluene; FIG. 2 shows the $^{11}$B-NMR spectrum of the product Mg(BH$_4$)$_2$ dissolved in ethyl ether; FIG. 3 is the powder X-ray diffraction diagram of the product Mg(BH$_4$)$_2$; FIG. 4 shows the $^{11}$B-NMR spectrum of the magnesium borohydride obtained in Example 2 dissolved in ethyl ether; FIG. 5 is the powder X-ray diffraction diagram of the magnesium borohydride obtained in Example 2.

EXAMPLE 1

The syntheses described in Example 1 were effected using commercial products open and manipulated in a dry box, maintained in a controlled dehydrated atmosphere (O$_2$ and H$_2$O)<5 ppm), after appropriate purification.

1) Preparation of the Solution of the Precursor Al(BH$_4$)$_3$ in Toluene 753 mg of purified LIBH$_4$ (34.56 mmoles) were weighed and ground in a pestle and introduced into a 100 ml bottle with a screw top. 50 ml of toluene were then added. 1.383 g of purified AlCl$_3$ (10.37 mmoles) were weighed, ground in a pestle and slowly added to the mixture of LIBH$_4$ in toluene. A further 41 ml of toluene were added, care being taken to wash the walls of the bottle well and the whole mixture was left under stirring for 60 hours at room temperature. The mixture was filtered and the filtrate was then distilled at a pressure of about 10$^{-1}$ mbar at 30° C. ([Al]=0.095 M, yield about 78%).

The $^{11}$B-NMR spectrum of the product is shown in FIG. 1 ($^{11}$B-NMR, toluene) and has the main peak at −36.50 ppm with J$_{B-M}$=88.8 Hz.

2) Synthesis of Mg(SH$_4$)$_2$:

4.5 ml of a 1M solution in heptane of Mg(n-But)$_2$ (4.5 mmoles) were dripped into 35 ml of a 0.095 M solution of Al(BH$_4$)$_3$ (3.33 mmoles) at −78° C.

The cooling was then stopped and the mixture was left under stirring at room temperature for a night. After filtering, washing twice with 11 ml of toluene and complete drying under vacuum, the powder was put in a flask with 25 ml of n-hexane and the mixture was left under stirring for 3 hours. After filtering, the precipitate was washed twice with 8 ml of n-hexane, evaporated under vacuum first at room temperature and then at 60° C. Yield 207 mg (85%).

The $^{11}$B-NMR spectrum of the product dissolved in ethyl ether is shown in FIG. 2 and has the main peak at −42-80 ppm, with J$_{B-H}$=83.01 Hz.

Elemental analysis of the solid product: Found C=3.59%, H=14.72%; Theoretical H=14.96% Purity in Mg=98%

The solid product was sealed in a Lindemann capillary in an inert atmosphere and subjected to powder X-ray diffraction. The diffraction diagram is shown in FIG. 3.

EXAMPLE 2

The syntheses described in Example 2 were effected using commercial products open and manipulated in a dry box, maintained in a controlled dehydrated atmosphere ($O_2$ and $H_2O$)<5 ppm).

10 ml of a 1M solution in heptane of $Mg(n\text{-But})_2$ (10 mmoles) were slowly dripped into 18 ml of a 2M solution in toluene of $H_3B.S(CH_3)_2$ (36 mmoles) and then left under stirring for 2 hours at room temperature. The mixture was then filtered and the precipitate washed twice with 15 ml of toluene. The precipitate was then dried under vacuum, at room temperature, at $10^{-1}$ mbar, for 6 hours and subsequently with a diffusive pump at $10^{-5}$ mbar, at 75° C., for 13 hours. 502 mg of product were obtained with a yield of 93%.

The $^{11}$B-NMR spectrum of the product dissolved in ethyl ether is shown in FIG. 4 and has the main peak at −42.80 ppm, with $J_{B-H}$=83.01 Hz.

Elemental analysis of the solid product: Found C=1.34%, H=14.11%; Theoretical H=14.96% Purity in Mg=99.3%

The solid product was sealed in a Lindemann capillary in an inert atmosphere and subjected to powder X-ray diffraction. The diffraction diagram is shown in FIG. 5.

The invention claimed is:

1. A process for the production of magnesium borohydride having a high purity and crystallinity, characterized in that it comprises a reaction of an organometallic compound of magnesium of the formula $MgX_2$, wherein X is an organic binder selected from alkyl, amide, alkoxide, cyclopentadienyl, aryl, with a derivative of a boron hydride $Al(BH_4)_3$, in a hydrocarbon solvent at a temperature of from −100° C. to +100° C.

2. The process according to claim 1, characterized in that the organometallic compound of magnesium $MgX_2$ is selected from the series of compounds wherein X=alkyl, cyclopentadienyl, alkoxide.

3. The process according to claim 2, characterized in that the alkyl is selected from n-But, t-But, $CH_2$(t-31 But) and the alkoxide OR is selected from R=n-propyl.

4. The process according to claim 1, characterized in tat the hydrocarbon solvent is selected from an aliphatic or aromatic hydrocarbon solvent and mixtures thereof 5. The process according to claim 1, characterized in that the hydrocarbon solvent is selected from heptane, toluene and mixtures thereof.

6. The process according to claim 1, characterized in that the reaction is carried out at atmospheric pressure.

7. The process according to claim 1 characterized in that the temperature varies from −78° C. to 75° C.

8. The process according to claim 1, characterized in that the reaction is carried out for an overall time ranging from 10 to 48 hours.

9. The process according to claim 8, characterized in that the overall time varies from 20 to 36 hours.

10. Crystalline magnesium borohydride having a purity equal to at least 98% upon elemental analysis, obtained with the process according to claim 1.

11. A process for the vapor deposition of dehydrogenated derivatives of the magnesium borohydride for producing thin films said process comprising reacting an organometallic compound of magnesium of the type $MgX_2$, wherein X is an organic binder selected from alkyl, amide, alkoxide, cyclopentadienyl, aryl, with a derivative of a boron hydride, $Al(BH_4)_3$ in a hydrocarbon solvent in the presence of a substrate at a temperature of −100° C. to 100° C.

12. A thin film obtained by the vapour deposition of dehydrogenated derivatives of crystalline magnesium borohydride obtained according to claim 11.

13. A process for the production of pure hydrogen which comprises dehydrogenating magnesium borohydride obtained according to claim 1.

14. The process according to claim 1, including a step where the magnesium borohydride is recovered by filtration.

* * * * *